United States Patent [19]

Wanat

[11] 4,390,133
[45] Jun. 28, 1983

[54] FOOD PROCESSOR

[75] Inventor: David J. Wanat, Meriden, Conn.

[73] Assignee: General Electric Company, New York, N.Y.

[21] Appl. No.: 272,676

[22] Filed: Jun. 11, 1981

[51] Int. Cl.³ .............................................. A47J 43/25
[52] U.S. Cl. .................................... 241/93; 241/285 A
[58] Field of Search .................... 241/169.1, 93, 88.4, 241/273.1, 273.2, 273.3, 273.4, 285 R, 285 A, 285 B

[56] References Cited

U.S. PATENT DOCUMENTS

| 2,071,130 | 2/1937 | Coventry | 83/63 |
| 3,635,270 | 1/1972 | Petroske et al. | 241/93 X |
| 3,907,215 | 9/1975 | Mantelet | 241/88.4 |

Primary Examiner—Mark Rosenbaum
Attorney, Agent, or Firm—John F. Cullen; George R. Powers; Leonard J. Platt

[57] ABSTRACT

The invention relates to a food processor of the slicer/shredder type having a power base L-shaped housing with a second feed chute housing rotatably attached to the L-shaped housing to extend above it in an operative position over the L with the chute foldable in a box-like position for compact and convenient storage. In this general combination, a simple clutch structure is disposed between the housing and chute to provide a rotatable function whereby the chute is rotated into one position for removal for cleaning, into a second upright position where food is inserted into cutters and discharged, and into a third position opposite the second whereby the chute is secured and locked into a compact low box-like profile for easy storage.

5 Claims, 6 Drawing Figures

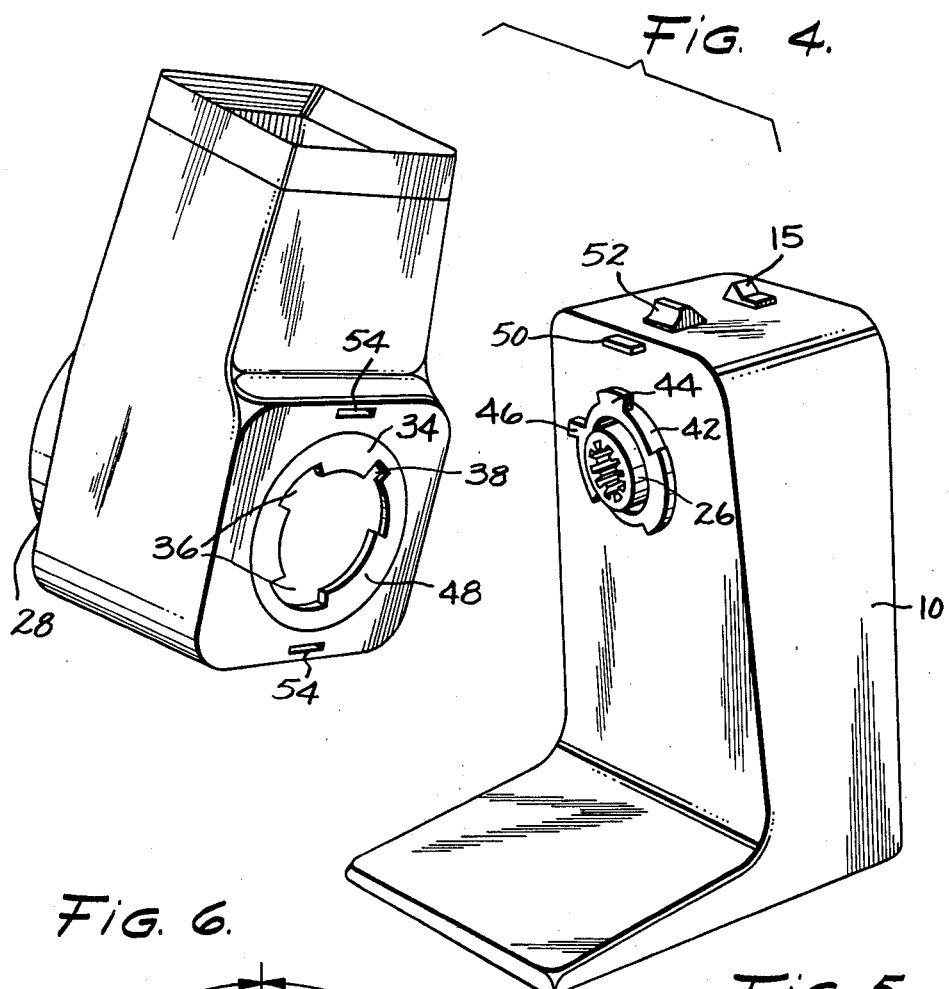
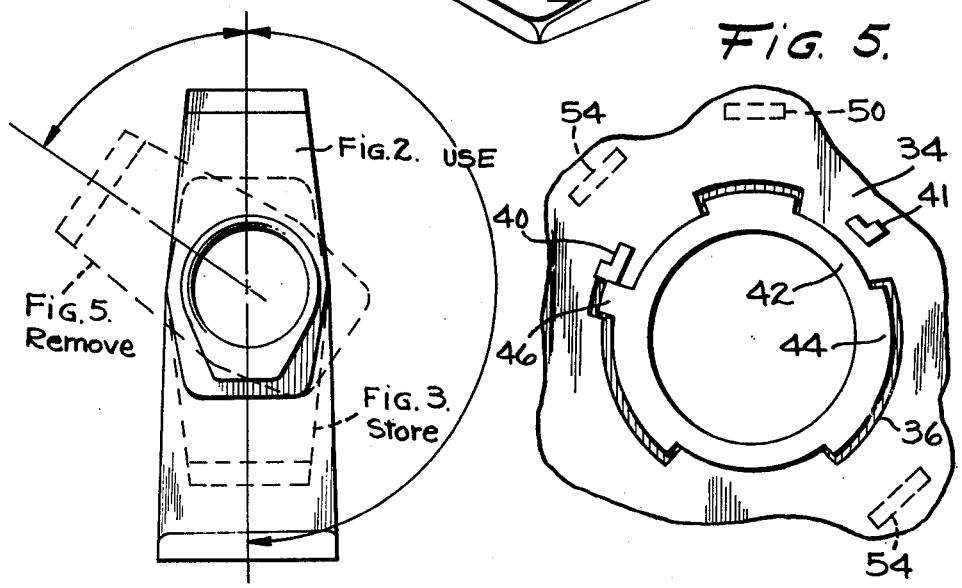

FOOD PROCESSOR

BACKGROUND OF THE INVENTION

1. Field of the Invention

The invention relates to a food processor of the slicer/shredder type having a power base L-shaped housing with a second feed chute housing rotatably attached to the L-shaped housing to extend above it in an operative position over the L with the chute foldable into a box-like position for compact and convenient storage. In this general combination, a clutch structure is provided to achieve the different functions.

2. Description of the Prior Art

It is known to use food processors, a device fitting in the speed range between blenders and mixers, as a multi-purpose kitchen apparatus which uses interchangeable rotary tools as various attachments for blending, mixing, grating, grinding, chopping, slicing, whipping, and other operations in a short time. These processors have become a commonly used kitchen appliance. Also, the old hand grinders, that mounted on the kitchen table with interchangeable outlet screens usually turned a screw thread to feed vertically inserted food axially outward through the screen to provide ground meat, such as hamburger, has been in use for decades. Usually butcher shops have such power operated machines but the principle is the same in this relatively slow moving grinder. Because certain jobs are better done at relatively slow speeds e.g. 125 rpm, between the two has evolved the slicer/shredder which usually comprises a horizontally rotatable cylindrical cutter whereby food is pushed into a hopper against the rotating cutter, passing through the cutter to exit a side outlet to process the food in still a different manner. Various cutters may be interchangeably mounted on the driven spindle to provide various cuttings whether turned by hand or motor driven. Generally these are rather tall machines using much counter space thus being rather bulky. Various devices have attempted to provide compactness by providing folding parts to obviate the bulkiness of an otherwise useful appliance. Of course, all food handling processors must have removable parts for cleaning.

An object of the invention is to provide a food processor of the general slicer/shredder type with an improved clutch means for the user to rotate the chute slightly off vertical into a removable position or to swing the chute up into a vertical operative position or completely rotate it beyond the vertical and downward to locked position whereby the entire appliance provides a compact low box-like profile for easy storage.

Another object is to provide such a processor that the user may swing the food receiving chute into an upright locked operative position or selectively rotate the chute one way for a biased removal for cleaning or the other way for a complete reversal so the processor folds into a box-like compact inoperative low profile storage position.

A final object is to provide a slicer/shredder which takes up little space on the kitchen counter and is conveniently changed from operative to inoperative storage position, comes apart for cleaning, and overall presents a low profile compact box-like storage position by simple rotation to the various positions by a unique clutch arrangement.

SUMMARY OF THE INVENTION

Briefly described, the invention is directed to a food processor of the slicer/shredder type that comprises an L-shaped upstanding base housing with an electric motor and rotatable, generally horizontal, shaft in the upper housing portion and with its axis aligned to extend centrally or aim over the L-portion but supported in the housing. A separate chute offset from the upstanding base is operatively locked to and extends above and is long enough to substantially fill the space over the L to the top of the base. Both housing and chute are preferably rectangular, the chute having a channel through it for a pusher to move the food therethrough. A cylindrical hollow cutter is removably disposed in one end of the chute with a driving connection between the shaft and the cutter. The chute has an axially aligned cylindrical outlet at and adjacent the cutter and a formed clutch around the shaft rotatably connects the offset chute and housing together at a common wall. Preferably, the contacting vertical walls between the chute and housing are slanted off the vertical and the motor driven shaft is slanted down an equivalent amount—up to 10° off the horizontal so the device is slightly tilted forward when operating so processed food more easily exits the outlet. A specific clutch of the general bayonet-type around the shaft rotatably connects the chute and housing together by meshing segments and fingers and internal stop means with a button-operable bar biased against the chute in diametrical slots on the chute with all parts being formed and oriented so the chute may be partly rotated in one direction from the vertical about the shaft such that the segments and tabs line up for biased removal and cleaning and/or the chute may be rotated substantially 180° in the other direction from the vertical for aligning and locking the chute and housing together in a box-like configuration for compact inoperative storage and low profile. Thus, the main object is to provide a food processor of the slicer/shredder type formed to provide a convenient side-by-side motor housing and food chute in three positions with the chute in the up or operative position and rotatable to be removed for cleaning or rotatable down for locking and storage position with an internal clutch structure to provide for all three positions with the folded position presenting a compact low profile box-like appliance.

BRIEF DESCRIPTION OF THE DRAWING

FIG. 4 is a perspective exploded view of the chute and housing showing the clutch structure.

FIG. 5 is a view like FIGS. 2 and 3 of the clutch structure in the chute "remove" position, and FIG. 6 is a front elevation showing the chute in its various positions with some dotted.

DESCRIPTION OF THE PREFERRED EMBODIMENT

Figure 1:
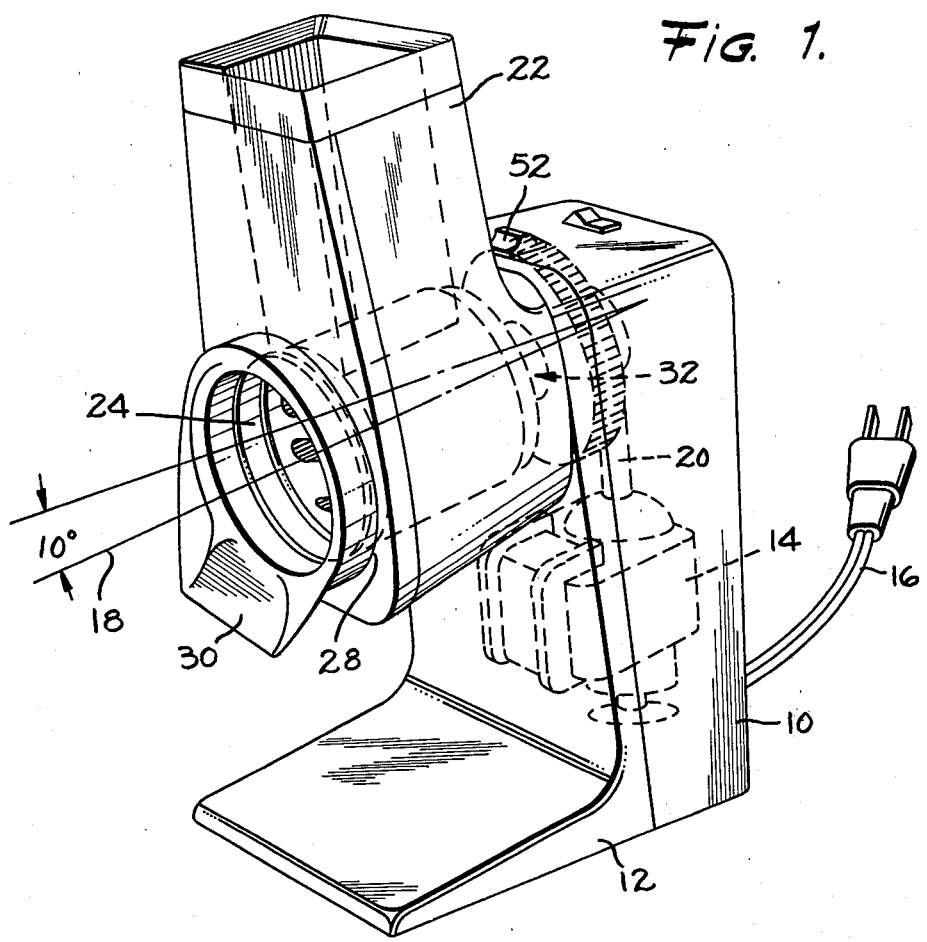
FIG. 1 is a perspective view showing the device in operative position with internal structure shown dotted.
Figures 2, 3:
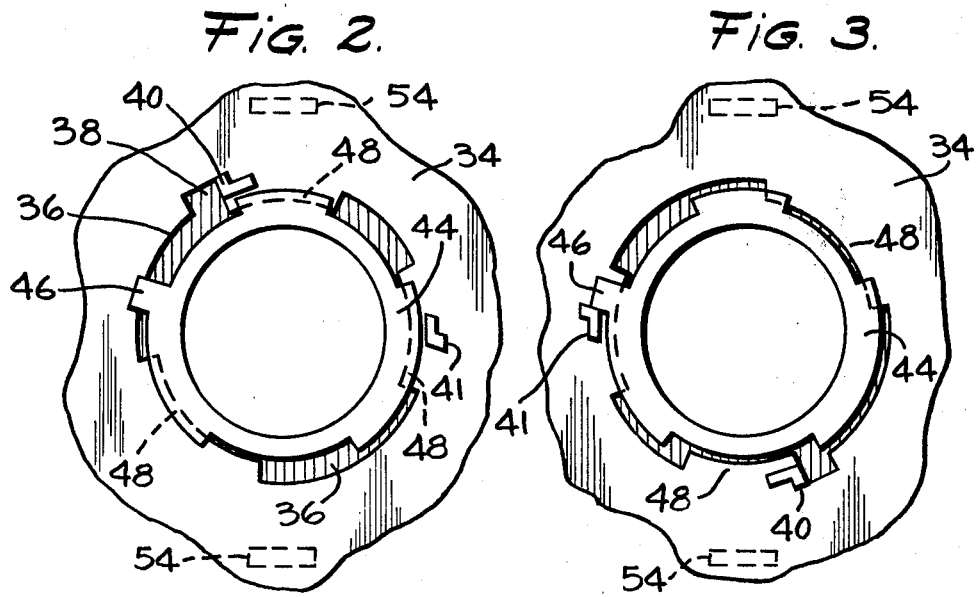
FIG. 2 is a view from inside the cutter of the clutch structure with the chute in the "up" position.
FIG. 3 is a view similar to FIG. 2 showing the clutch with the chute in the "down" position.

Referring to FIG. 1, there is shown a food processor of the slicer/shredder type with an upstanding L-shaped power base housing 10 with a thin L supporting leg 12 of the general type in numerous appliances such as drip coffeemakers and provided for stability. Disposed in upstanding base portion 10 is internal electric motor 14 operable by switch 15 and powered from cord 16 and the base housing has a rotatable generally horizontal shaft 18 that is drivingly connected by gears or belt 20 with the motor. The axis 18 is aligned in the upper housing portion such that, if extended, it would lie or aim centrally over the leg 12 both along the leg and midway between its edges. Preferably, the axis is slanted down up to 10° below and over the L-portion as indicated in FIG. 1. The term "generally horizontal" is intended to include this variation since the actual preferred dip of shaft 18 is 7°. In order to provide slicing/shredding capabilities, a separate offset chute 22, which may have a fitted food pusher, not shown, is operatively locked by a clutch to the adjacent housing 10 such that it extends above and is long enough to substantially fill the vertical space over the leg 12 to the top of the base 10 when in folded position (FIG. 3) as indicated dotted in FIG. 6. For cutting, a cylindrical known detachable hollow cutter 24 is connected in one end of the chute 22 and a coupling or driving connection such as spline connection 26 (FIG. 4) is located between the shaft and the cutter. For exiting processed food, an outlet 28 is axially aligned with driving shaft 18 in the chute vertical wall and adjacent cutter 24. Both housing and chute are rectangularly-walled members with outlet 28 being generally circular and provided with a formed detachable guiding spout 30 for directing the food downwardly into an adjacent bowl not shown. The structure thus far described of the generally foldable compact slicer/shredder is disclosed and claimed in commonly assigned co-pending application Ser. No. 272,674 filed concurrently. This application is directed to the specific clutch means 32 rotatably connecting the chute and housing at their abutting faces as shown. Such clutch comprises an annular collar 34 fixed in a coplanar manner in the back wall of the chute opposite the chute outlet 28. The collar is annular to permit the splined driving connection 26 to extend concentrically therethrough and mesh with an external gear on and drive the cutter. For preventing chute removal from the housing except at one removal (FIG. 5) position, the collar is provided with plural segmented openings 36 around the inner collar periphery and one of the segments has an extra radial notch 38 at one end of the segment extending outwardly beyond the segment. To locate or lock the rotatable chute in its desired positions, a pair of peripherally spaced stops 40 and 41 are disposed on the cutter side or inside surface of the collar as shown in FIGS. 2, 3, and 5. These are on the opposite side of the collar from that shown in FIG. 4. To cooperate with the annular collar 34 and its segments 36, the upper portion of the housing has a ring 42 protruding or spaced out from base 10 for a bayonet lock as will become apparent. The ring is provided with radial tabs 44, one of which includes a finger 46 to cooperate or match with notch 38 in annular collar 34 and tabs 44 are dimensioned to match the segments 36 (FIG. 5). For purposes to be explained, some of the segments 36 and tabs 44 are of different arcuate lengths as shown. The relationship of the clutch parts is such that when the chute is rotated to the position shown in FIG. 5 or slightly left of vertical as shown in FIG. 6, the segments 36 and corresponding tabs 44 are aligned so that the chute is in "remove" and may be easily slid off or detached from the housing. This position is determined by the engagement of rotating finger 46 abutting fixed stop 40 at which time the parts are aligned for easy removal as shown in FIG. 5.

When the device is to be operative, the chute is rotated "up" into vertical position as illustrated in FIGS. 2 and 6 where the clutch parts are held together by overlapping of tabs 44 with the spaces 48 between segments 36 so the parts cannot separate as shown in FIG. 2. In this position, stops 40, 41 abut nothing and finger 46 has only a slight overlap with collar 34 so practically, the stops and finger serve no purpose in this position.

In the stored or "down" position as shown in FIGS. 3 and 6, further clockwise rotation from the FIG. 2 position substantially 180° from the vertical continues the overlap between tabs 44 and spaces 48 so the clutch parts are held from separating. In this stored "down" position, finger 46 and stop 41 abut as stop 41 rotates against fixed finger 46 to stop and locate the chute in the "down" or stored position.

For locking the chute in its "up" (FIG. 2) and "down" or storage position (FIG. 3), a control lock means of a slidable horizontal bar 50, that is operable by button 52, slides horizontally or axially in and out of housing 10. The bar is internally spring-biased into outward position shown in FIG. 4 so it presses against the mounted chute at all times. For locking in the "up" and "down" positions, the rotatable chute has diametrically opposite slots 54 concentric with the collar and toward which bar 50 is biased at all times. The chute is located in the "down" or stored position by stop 41 abutting the other side of finger 46 (FIG. 3) to align slots 54 and biased bar 50 which snaps into locked engagement. The opposite slot is engaged by bar 50 when rotated to "up" position (FIG. 2) to lock the chute. Since slots 54 are not aligned to be engageable in the "remove" position (FIG. 5) they push the clutch apart for easy chute removal.

In operation, the parts are engaged by turning the chute slightly counterclockwise to align ring 42 and annular collar 34 as shown in FIG. 5, pressing the chute in against the bias of bar 50 and rotating the chute in one direction (clockwise) to vertical where it locks because bar 50 is biased into upper slot 54 as shown in FIG. 2. While rotating from FIG. 5 into FIG. 2 the chute is not removable because of the overlap between tabs 44 and spaces 48. For "down" or storage, button 52 is retracted against the bias to withdraw bar 50 and further rotation of 180° (during which removal is prevented by the same overlap,) puts the clutch parts in the position of FIG. 3 where it is stopped by the abutment between stop 41 and finger 46 for proper alignment and then bar 50 is biased into slot 54 slocking the chute and housing together boxlike for compact low profile storage as shown in FIG. 6.

While I have hereinbefore shown a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

I claim:

1. A food processor of the slicer/shredder type having an L-shaped upstanding base housing with a top and an electric motor therein, a rotatable generally horizontal shaft in the upper housing portion drivingly connected with said motor and with its axis aligned to extend centrally over the L, a separate chute offset from the upstanding base and operatively locked to extend above and long enough to substantially fill the space over the L to said base top, a cylindrical hollow cutter disposed in one end of said chute, a driving connection between said shaft and cutter, an axially aligned outlet in said chute at and adjacent said cutter, a clutch around said shaft rotatably connecting said chute and housing, said clutch comprising, an annular collar having an inner periphery and fixed in said one chute end opposite said chute outlet, said driving connection extending through said collar to drive said cutter, plural segmented openings around the inner collar periphery, one of said openings having a radial notch at one end thereof, peripheral spaced stops on the cutter side of said collar, a protruding ring on said base, radial tabs including a finger for said notch disposed on said ring and dimensioned to match said segments, control lock means connecting said chute and housing adjacent said clutch so the chute may be partly rotated in one direction from vertical whereby a stop engages one side of said finger and said segments and tabs line up for chute removal and the chute may be rotated in the other direction into vertical operative position and locked by said control means, and may be further rotated beyond substantially 180° from vertical whereby a stop engages the other side of said finger for aligning and locking said chute and housing together box-like for compact inoperative storage.

2. Apparatus as described in claim 1 wherein said annular collar is disposed in said chute wall coplanar therewith and said protruding ring is spaced outward of the housing wall for a rotatable bayonet lock with said collar.

3. Apparatus as described in claim 2 wherein some of said segments and tabs are of different arcuate lengths permitting chute removal when aligned.

4. Apparatus as described in claim 3 wherein said driving connection is concentric within said collar.

5. Apparatus as described in claim 4 wherein said control lock means is a button-operable bar biased against said chute and, diametrical top and bottom slots concentric with said collar in said chute for said bar to lock the chute in vertical and stored position and said chute is biased away from said housing in lined up tab/segment chute removal position.

* * * * *